United States Patent
Suzuki et al.

(10) Patent No.: US 10,837,538 B2
(45) Date of Patent: Nov. 17, 2020

(54) TRANSMISSION AND DRIVING APPARATUS PROVIDED WITH TRANSMISSION

(71) Applicant: KYB Corporation, Tokyo (JP)

(72) Inventors: Jun Suzuki, Kanagawa (JP); Kenji Suzuki, Kanagawa (JP)

(73) Assignee: KYB CORPORATION, Tokyo (JP)

( * ) Notice: Subject to any disclaimer, the term of this patent is extended or adjusted under 35 U.S.C. 154(b) by 0 days.

(21) Appl. No.: 16/342,851

(22) PCT Filed: Oct. 19, 2017

(86) PCT No.: PCT/JP2017/037873
§ 371 (c)(1),
(2) Date: Apr. 17, 2019

(87) PCT Pub. No.: WO2018/079410
PCT Pub. Date: May 3, 2018

(65) Prior Publication Data
US 2019/0264796 A1 Aug. 29, 2019

(30) Foreign Application Priority Data
Oct. 28, 2016 (JP) .................................. 2016-211919

(51) Int. Cl.
*F16H 57/029* (2012.01)
*F16J 15/06* (2006.01)
*F16H 57/031* (2012.01)

(52) U.S. Cl.
CPC ......... *F16H 57/029* (2013.01); *F16H 57/031* (2013.01); *F16J 15/06* (2013.01)

(58) Field of Classification Search
CPC ........ F16H 57/029; F16H 57/031; F16J 15/06
See application file for complete search history.

(56) References Cited

FOREIGN PATENT DOCUMENTS

| JP | H01-078766 U | 5/1989 |
|----|--------------|--------|
| JP | 2005-027366 A | 1/2005 |
| JP | 2014-190444 A | 10/2014 |
| JP | 2014199063 A * | 10/2014 |

* cited by examiner

*Primary Examiner* — Luis A Gonzalez
(74) *Attorney, Agent, or Firm* — Rabin & Berdo, P.C.

(57) ABSTRACT

The transmission includes: an open-end cover fitted to an inner circumference of an open end portion of a rotary housing, the cover being configured to close the open end portion; an O-ring provided between the rotary housing and the open-end cover in the compressed state in the axial direction of the rotary housing, the O-ring being configured to seal between the inner circumferential portion of the rotary housing and the outer circumferential portion of the open-end cover; and a snap ring configured to restrict the movement of the open-end cover in the axial direction. The open-end cover is pushed against the snap ring by the repulsive force exerted by the compressed O-ring.

6 Claims, 3 Drawing Sheets

TRANSMISSION AND DRIVING APPARATUS PROVIDED WITH TRANSMISSION

TECHNICAL FIELD

The present invention relates to a transmission and a driving apparatus provided with the transmission.

BACKGROUND ART

JP2014-190444A discloses a transmission used for a drive motor of a crawler vehicle such as a hydraulic shovel, etc.

The above-described transmission is provided with a cylinder-shaped rotary housing to which a sprocket meshing with a crawler belt is connected and a disc-shaped open-end cover that closes an open end of the rotary housing. The open-end cover is engaged with the rotary housing via a wire provided in a cylinder-shaped space that is formed between an inner circumference groove formed in an inner circumference of the rotary housing and an outer circumference groove formed in the outer circumference of the open-end cover.

A transmission mechanism that decelerates speed of output rotation from a hydraulic motor and transmits the output rotation to the rotary housing is accommodated inside the rotary housing and the open-end cover. The inside of the rotary housing and the open-end cover is filled with lubricating oil for lubricating the transmission mechanism. In such a configuration, a seal member (O-ring) for preventing a leakage of the lubricating oil to the outside of the rotary housing is provided between the inner circumference of the rotary housing and the outer circumference of the open-end cover.

SUMMARY OF INVENTION

Because there is a gap between the inner circumference of the rotary housing and the outer circumference of the open-end cover, unwanted matters such as dirt, etc. may enter the gap. As described above, because the seal member is provided between the inner circumference of the rotary housing and the outer circumference of the open-end cover, it is possible to prevent further entry of the unwanted matters to the inside of the transmission.

Here, in the above-described transmission, the outer diameter of a wire for engaging the open-end cover with the rotary housing is designed such that a clearance is formed with respect to the cylinder-shaped space between the inner circumference groove of the rotary housing and the outer circumference groove of the open-end cover. Therefore, a relative displacement between the rotary housing and the open-end cover can occur in the axial direction by an amount corresponding to the clearance.

As described above, in a configuration in which the relative displacement between the rotary housing and the open-end cover can occur in the axial direction, when the relative displacement between the rotary housing and the open-end cover occurs in the axial direction due to vibration, etc., the seal member is also caused to move in the axial direction.

Therefore, if a great amount of the unwanted matters enter between the inner circumference of the rotary housing and the outer circumference of the open-end cover and are accumulated in a vicinity of the seal member, it is conceivable that, when the seal member is moved in the axial direction, the unwanted matters are entrapped on a sealing face and a durability of the seal member is affected.

The present invention is made in view of such a technique problem, and an object thereof is to improve a durability of a seal member.

According to a certain aspect of the present invention, a transmission includes: a transmission mechanism configured to change speed of output rotation from a driving source; a cylinder-shaped rotary housing configured to accommodate the transmission mechanism, the rotary housing being configured to be rotated as the output rotation the speed of which has been changed is transmitted; a cover fitted to an inner circumference of an open end portion of the rotary housing, the cover being configured to close the open end portion; a seal member provided between the rotary housing and the cover in a compressed state in an axial direction of the rotary housing, the seal member being configured to seal between an inner circumferential portion of the rotary housing and an outer circumferential portion of the cover; and a restricting member configured to restrict movement of the cover in the axial direction. The cover is pushed against the restricting member by a repulsive force exerted by the compressed seal member.

DESCRIPTION OF EMBODIMENT

Figure 1:
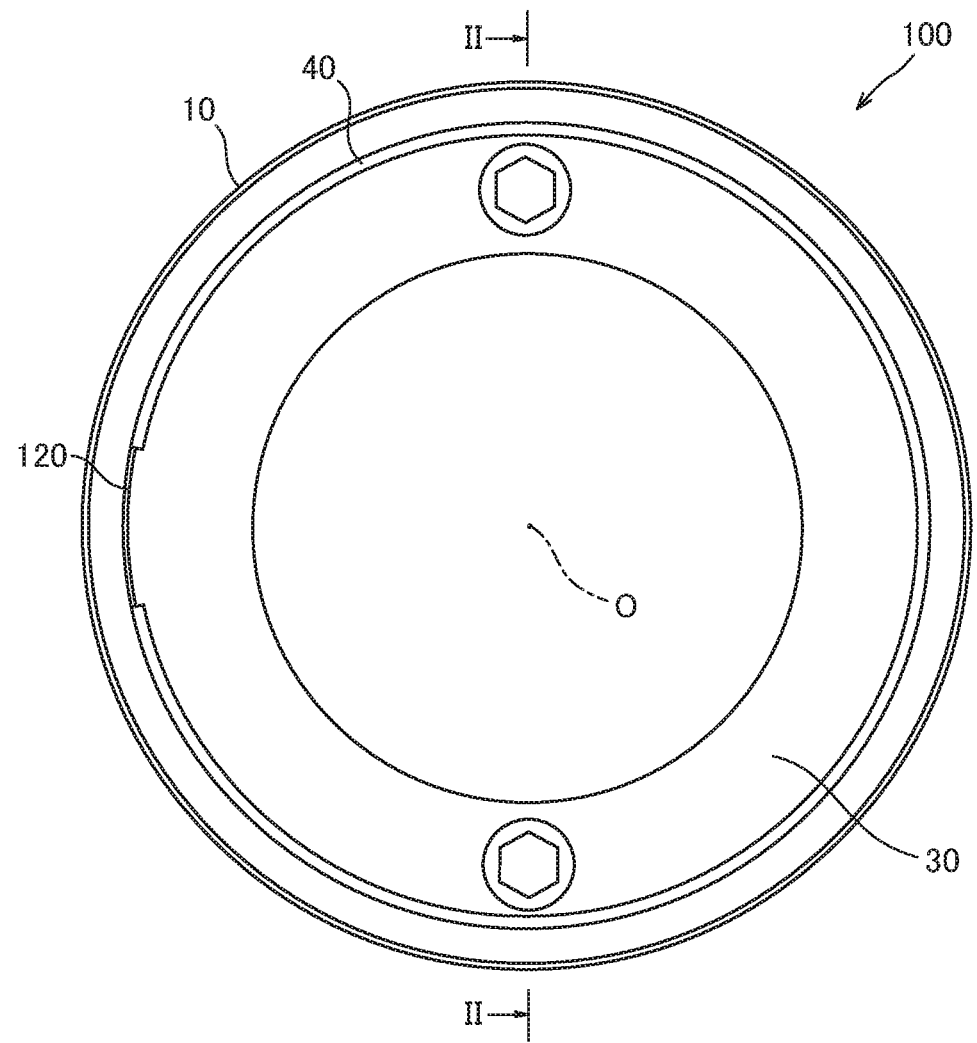
FIG. 1 is a side view of a transmission according to an embodiment of the present invention.

A transmission 100 according to an embodiment of the present invention will be described below with reference to FIGS. 1 to 3.

The transmission 100 is used for, for example, a drive motor that is provided in an axle portion of a crawler vehicle such as a hydraulic shovel, etc. to drive a crawler belt. The drive motor serving as a driving apparatus is provided with a hydraulic motor 1 serving as a driving source and the transmission 100 that changes output rotation speed of a shaft 21 of the hydraulic motor 1.

The transmission 100 is provided with a transmission mechanism 20 that changes the output rotation speed of the shaft 21 of the hydraulic motor 1 and a cylinder-shaped rotary housing 10 that accommodates the transmission mechanism 20 and that is rotated as the output rotation, the speed of which has been changed, is transmitted. The rotary housing 10 is rotationally operated with respect to a stationary housing (not shown). In addition, a sprocket (not shown) is connected to an outer circumferential surface of the rotary housing 10. The vehicle travels as the rotary housing 10 and the sprocket are rotated together to circulate a crawler belt (not shown) meshed with the sprocket.

The stationary housing and the rotary housing 10 are arranged inside the circulating path of the crawler belt. The rotary housing 10 is freely rotatably supported via a bearing (not shown) with respect to the stationary housing attached to a frame of the vehicle, and is rotationally operated about a rotation axis O.

The hydraulic motor 1 is provided in the stationary housing. The hydraulic motor 1 is, for example, a swash-plate-type piston motor. The driving source may not be the hydraulic motor, and an electric motor, etc. may be used.

Figure 2:
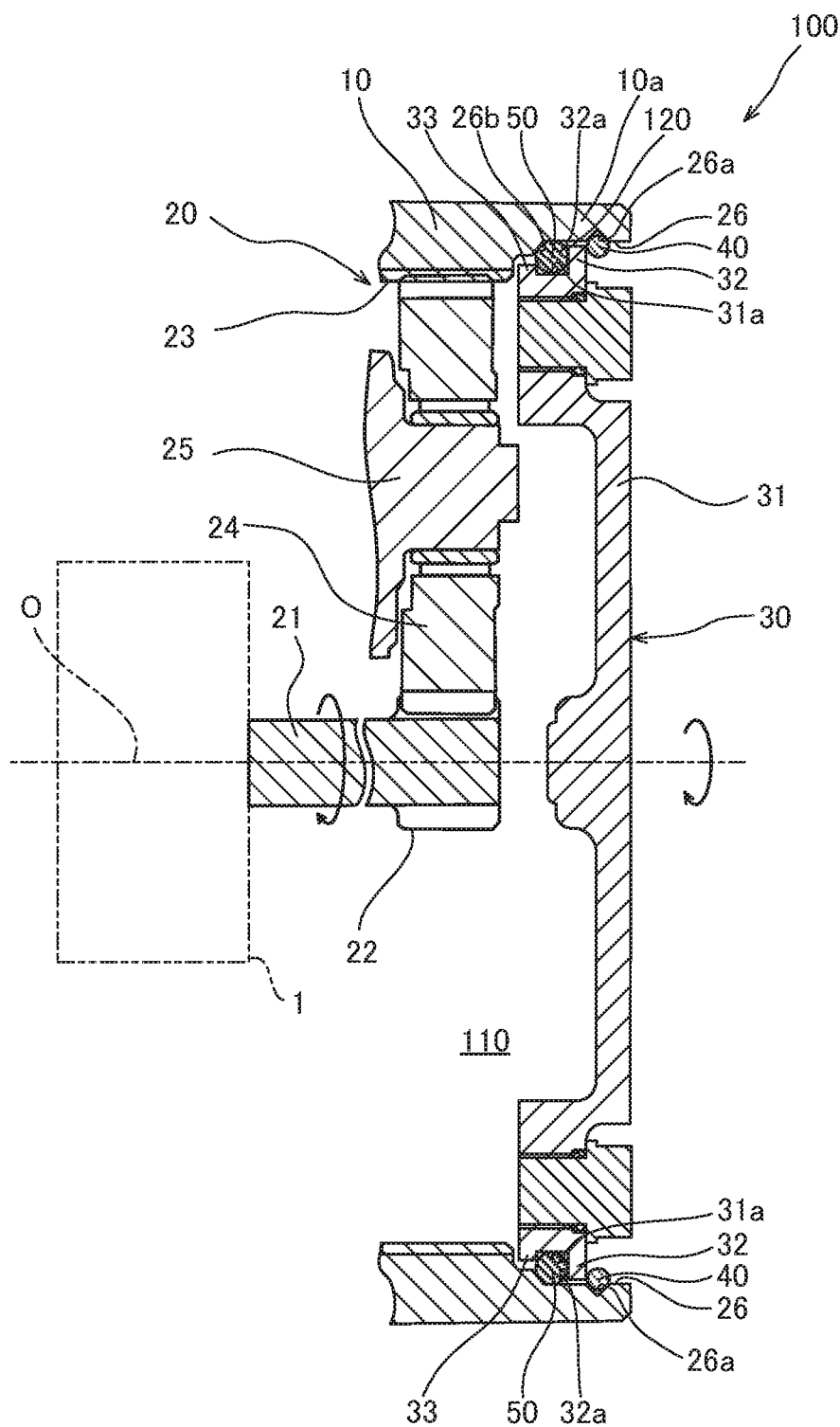
FIG. 2 is a sectional view taken along a line II-II in FIG. 1.

As shown in FIG. 2, the transmission mechanism 20 is formed of a sun gear 22 that is provided on the shaft 21 of the hydraulic motor 1, an inner gear 23 that is a ring gear provided on an inner wall of the rotary housing 10, a plurality of planetary gears 24 that mesh with both the sun gear 22 and the inner gear 23, a planetary carrier 25 that supports respective planetary gears 24, and so forth.

The transmission mechanism 20 decelerates the output rotation speed of the shaft 21 of the hydraulic motor 1 and transmits the output rotation to the rotary housing 10. With such a configuration, the sprocket is rotationally operated together with the rotary housing 10.

A disc-shaped open-end cover 30 serving as a cover for closing an open end portion 10a is fitted to an inner circumference of the open end portion 10a of the rotary housing 10.

Figure 3:
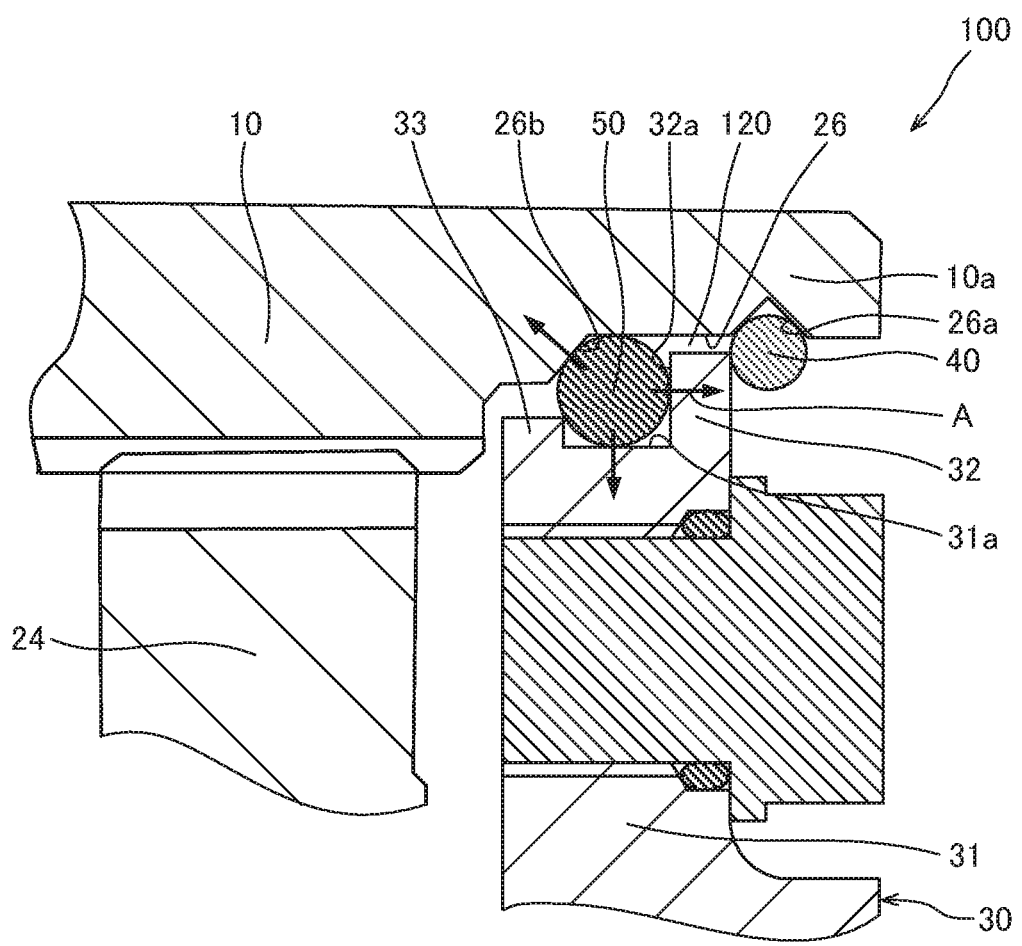
FIG. 3 is an enlarged view of relevant portions of the transmission according to the embodiment of the present invention.

As shown in FIGS. 2 and 3, the open-end cover 30 has a disc-shaped main body portion 31, an annular flange part 32 that is provided between an O-ring 50 serving as a seal member, which will be described below, and a snap ring 40 serving as a restricting member, which will be described below, so as to project outwards in the radial direction from an outer circumferential surface 31a of the main body portion 31, and a protruded portion 33 that is formed so as to project from the outer circumferential surface 31a of the main body portion 31 and so as to be spaced from the flange part 32. The protruded portion 33 is formed to have an annular shape having a smaller diameter than the flange part 32.

An attachment recessed portion 26 having a larger diameter than other parts is formed in an inner circumferential surface of the open end portion 10a of the rotary housing 10. The open-end cover 30 is fitted to the attachment recessed portion 26 and held to the rotary housing 10 by causing the snap ring 40 serving as the restricting member to engage with an annular engaging groove 26a formed in the attachment recessed portion 26.

A gear case 110 is filled with lubricating oil for lubricating the transmission mechanism 20. The space in the gear case 110 need not be fully filled with the lubricating oil, and an amount of the lubricating oil to be filled in the gear case 110 is adjusted appropriately.

The O-ring 50 serving as the seal member for sealing between an inner circumferential portion of the rotary housing 10 and an outer circumferential portion of the open-end cover 30 is provided between the rotary housing 10 and the open-end cover 30. Specifically, the O-ring 50 is provided, in a compressed state, between a tapered surface 26b serving as a sealing face and a side surface 32a on the transmission mechanism side of the flange part 32 of the open-end cover 30. The tapered surface 26b is formed on the attachment recessed portion 26 of the rotary housing 10 such that its diameter is increased towards the open end. Because the tapered surface 26b is tapered with respect to the rotation axis O of the rotary housing 10, the O-ring 50 is pressed into the tapered surface 26b of the rotary housing 10, the outer circumferential surface 31a of the main body portion 31 of the open-end cover 30, and the side surface 32a of the flange part 32 of the open-end cover 30, and thereby, a seal structure is formed. With such a configuration, it is possible to prevent leakage of the lubricating oil from the gear case 110 to the outside thereof.

Because the transmission 100 is used for the drive motor of the hydraulic shovel, etc., the transmission 100 is often used in an environment in which the transmission 100 tends to be covered with the unwanted matters such as dirt, etc. Therefore, the unwanted matters such as dirt, etc. may enter a gap 120 between the rotary housing 10 and the open-end cover 30.

As described above, because the O-ring 50 is provided between the inner circumference of the rotary housing 10 and the outer circumference of the open-end cover 30, it is possible to prevent further entry of the unwanted matters into the inside of the transmission 100.

However, if relative displacement is caused between the rotary housing 10 and the open-end cover 30 in the axial direction (the direction along the rotation axis O of the rotary housing 10) due to vibration, etc., the O-ring 50 is also caused to move in the axial direction. Therefore, if a great amount of the unwanted matters enter from between the inner circumference of the rotary housing 10 and the outer circumference of the open-end cover 30 and are accumulated in a vicinity of the O-ring 50, when the O-ring 50 is moved in the axial direction, the O-ring 50 may sit over the accumulated unwanted matters, and the unwanted matters may be entrapped on the sealing face. It is conceivable that, if the O-ring 50 is moved in the axial direction in this state, the O-ring 50 is damaged and a durability of the O-ring 50 is affected.

Thus, in this embodiment, in order to restrict the movement of the O-ring 50, the movement of the open-end cover 30 in the axial direction is restricted. The detail of the embodiment will be described below.

As described above, the O-ring 50 is provided, in a compressed state, between the tapered surface 26b of the rotary housing 10 and the side surface 32a of the open-end cover 30. Therefore, as shown by arrows in FIG. 3, the repulsive forces from the compressed O-ring 50 respectively act on the tapered surface 26b of the rotary housing 10, the outer circumferential surface 31a of the open-end cover 30, and the side surface 32a of the open-end cover 30. The repulsive force A acting on the side surface 32a of the open-end cover 30 acts in the axial direction of the rotary housing 10 and pushes the flange part 32 of the open-end cover 30 against the snap ring 40. As described above, with the transmission 100, because the open-end cover 30 is pushed against the snap ring 40 by the repulsive force exerted by the compressed O-ring 50 in the axial direction of the rotary housing 10, the movement of the open-end cover 30 in the axial direction is restricted. Therefore, the movement of the O-ring 50 can be restricted, and it is possible to prevent the damage of the O-ring 50 and to improve the durability thereof.

The embodiment described above affords the following effects.

With the transmission 100, the O-ring 50 is provided between the rotary housing 10 and the open-end cover 30 in a compressed state in the axial direction of the rotary housing 10. With such a configuration, the open-end cover 30 is pushed against the snap ring 40 by the repulsive force exerted by the compressed O-ring 50, and thereby, the movement the open-end cover 30 in the axial direction is restricted. Therefore, the movement of the O-ring 50 can be restricted, and it is possible to prevent the damage of the O-ring 50 and to improve the durability thereof.

In addition, with the transmission 100, the O-ring 50 is supported between the flange part 32 and the protruded portion 33. With such a configuration, it is possible to prevent the O-ring 50 from falling off from the open-end cover 30 when, for example, the open-end cover 30 is assembled.

With the transmission 100, because the sealing face is formed by the tapered surface 26b that is formed such that its diameter is increased towards the open end of the rotary housing 10, the repulsive force exerted by the O-ring 50 also acts on the outer circumferential surface 31a of the main body portion 31 in addition to the side surface 32a of the flange part 32 of the open-end cover 30. In other words, the tapered surface 26b of the rotary housing 10, the outer circumferential surface 31a of the open-end cover 30, and the side surface 32a of the open-end cover 30 function as the sealing faces. With such a configuration, because three seal positions can be ensured for the O-ring 50, it is possible to improve the sealing property between the rotary housing 10 and the open-end cover 30.

In addition, most of the gap 120 between the rotary housing 10 and the open-end cover 30 can be covered by the snap ring 40 (see FIG. 1). Therefore, by using the snap ring 40, it is possible to suppress entry of the unwanted matters such as dirt, etc. from the gap 120.

In the above-mentioned embodiment, although the sealing face is formed by the tapered surface 26b, instead of this configuration, the sealing face may be formed by a flat surface extending along the radial direction of the rotary housing 10. Also in this case, because the repulsive force exerted by the O-ring 50 acts in the axial direction of the rotary housing 10, it is possible to push the flange part 32 of the open-end cover 30 against the snap ring 40.

The configurations, operations, and effects of the embodiment according to the present invention will be collectively described below.

The transmission 100 includes: the transmission mechanism 20 configured to change speed of the output rotation from the driving source (the hydraulic motor 1); the cylinder-shaped rotary housing 10 configured to accommodate the transmission mechanism 20, the rotary housing 10 being configured to be rotated as the output rotation the speed of which has been changed is transmitted; the cover (the open-end cover 30) fitted to the inner circumference of the open end portion 10a of the rotary housing 10, the cover being configured to close the open end portion 10a; the seal member (the O-ring 50) provided between the rotary housing 10 and the cover (the open-end cover 30) in the compressed state in the axial direction of the rotary housing 10, the seal member (the O-ring 50) being configured to seal between the inner circumferential portion of the rotary housing 10 and the outer circumferential portion of the cover (the open-end cover 30); and the restricting member (the snap ring 40) configured to restrict the movement of the cover (the open-end cover 30) in the axial direction, wherein the cover (the open-end cover 30) is pushed against the restricting member (the snap ring 40) by the repulsive force exerted by the compressed seal member (the O-ring 50).

In addition, the cover (the open-end cover 30) has the disc-shaped main body portion 31; and the flange part 32 provided between the seal member (the O-ring 50) and the restricting member (the snap ring 40) so as to project from the outer circumferential surface 31a of the main body portion 31, the rotary housing 10 has the sealing face (the tapered surface 26b) with which the seal member (the O-ring 50) comes into contact, and the seal member (the O-ring 50) is provided between the flange part 32 and the sealing face (the tapered surface 26b) in the compressed state.

With these configurations, because the open-end cover 30 is pushed against the restricting member (the snap ring 40) by the repulsive force exerted by the compressed seal member (the O-ring 50), the movement of the open-end cover 30 in the axial direction is restricted. Thus, because the movement of the seal member (the O-ring 50) is restricted, it is possible to prevent the damage of the seal member (the O-ring 50) and to improve the durability.

The cover (the open-end cover 30) further has the protruded portion 33 formed so as to project from the outer circumferential surface 31a of the main body portion 31, the protruded portion 33 being formed so as to be spaced from the flange part 32, and the seal member (the O-ring 50) is supported between the flange part 32 and the protruded portion 33.

With this configuration, because the seal member (the O-ring 50) is supported between the flange part 32 and the protruded portion 33, it is possible to prevent the seal member (the O-ring 50) from falling off from the open-end cover 30 when, for example, the open-end cover 30 is assembled.

In addition, the sealing face is formed by the tapered surface 26b, the sealing face being formed such that its diameter is increased towards the open end.

With this configuration, because the sealing face is formed by the tapered surface 26b that is formed such that its diameter is increased towards the open end of the rotary housing 10, the repulsive force exerted by the seal member (the O-ring 50) also acts on the outer circumferential surface 31a of the main body portion 31 in addition to the side surface 32a of the flange part 32 of the open-end cover 30. Thus, it is possible to improve the sealing property between the rotary housing 10 and the open-end cover 30.

In addition, the driving apparatus includes the transmission 100 and the driving source (the hydraulic motor 1).

Embodiments of this invention were described above, but the above embodiments are merely examples of applications of this invention, and the technical scope of this invention is not limited to the specific constitutions of the above embodiments.

In the above-mentioned embodiment, a description has been given of the example in which the drive motor is employed as the driving apparatus: however, the present invention can be applied to a swing motor, a motor for driving an winch, etc., and so forth.

In addition, the cross section of the snap ring 40 is not limited to the circular shape, and the cross section may be a square shape. A C-shaped retaining ring or an E-shaped retaining ring may also be employed.

The above-mentioned embodiments may be combined appropriately.

This application claims priority based on Japanese Patent Application No. 2016-211919 filed with the Japan Patent Office on Oct. 28, 2016, the entire contents of which are incorporated into this specification.

The invention claimed is:

1. A transmission comprising:
   a transmission mechanism configured to change speed of output rotation from a driving source;
   a cylinder-shaped rotary housing configured to accommodate the transmission mechanism, the rotary housing being configured to be rotated as the output rotation the speed of which has been changed is transmitted;
   a cover fitted to an inner circumference of an open end portion of the rotary housing, the cover being configured to close the open end portion;
   a seal member provided between the rotary housing and the cover in a compressed state in an axial direction of the rotary housing, the seal member being configured to seal between an inner circumferential portion of the rotary housing and an outer circumferential portion of the cover; and a restricting member configured to restrict movement of the cover in the axial direction, wherein the cover is pushed against the restricting member by a repulsive force exerted by the compressed seal member, wherein the cover has:

a disc-shaped main body portion; and a flange part provided between the seal member and the restricting member so as to project from an outer circumferential surface of the main body portion, and the rotary housing has a sealing face with which the seal member comes into contact, and the seal member is provided between the flange part and the sealing face in a compressed state and wherein the sealing face is formed by a tapered surface, the sealing face being formed such that a diameter of the sealing face is increased towards an open end.

2. The transmission according to claim 1, wherein the cover further has a protruded portion formed so as to project from the outer circumferential surface of the main body portion, the protruded portion being formed so as to be spaced from the flange part, and the seal member is supported between the flange part and the protruded portion.

3. A driving apparatus comprising the transmission according to claim 1 and the driving source.

4. The transmission according to claim 1, wherein the restricting member is configured to be engaged with an annular engaging groove formed in the rotary housing.

5. The transmission according to claim 1, wherein the restricting member is configured to cover a gap between the rotary housing and the cover.

6. The transmission according to claim 1, wherein an attachment recessed portion having a larger diameter than other parts is formed in an inner circumferential surface of the open end portion of the rotary housing, and a clearance is provided between an end surface of the cover in the axial direction and a bottom surface of the attachment recessed portion facing the end surface.

* * * * *